Figure 1:
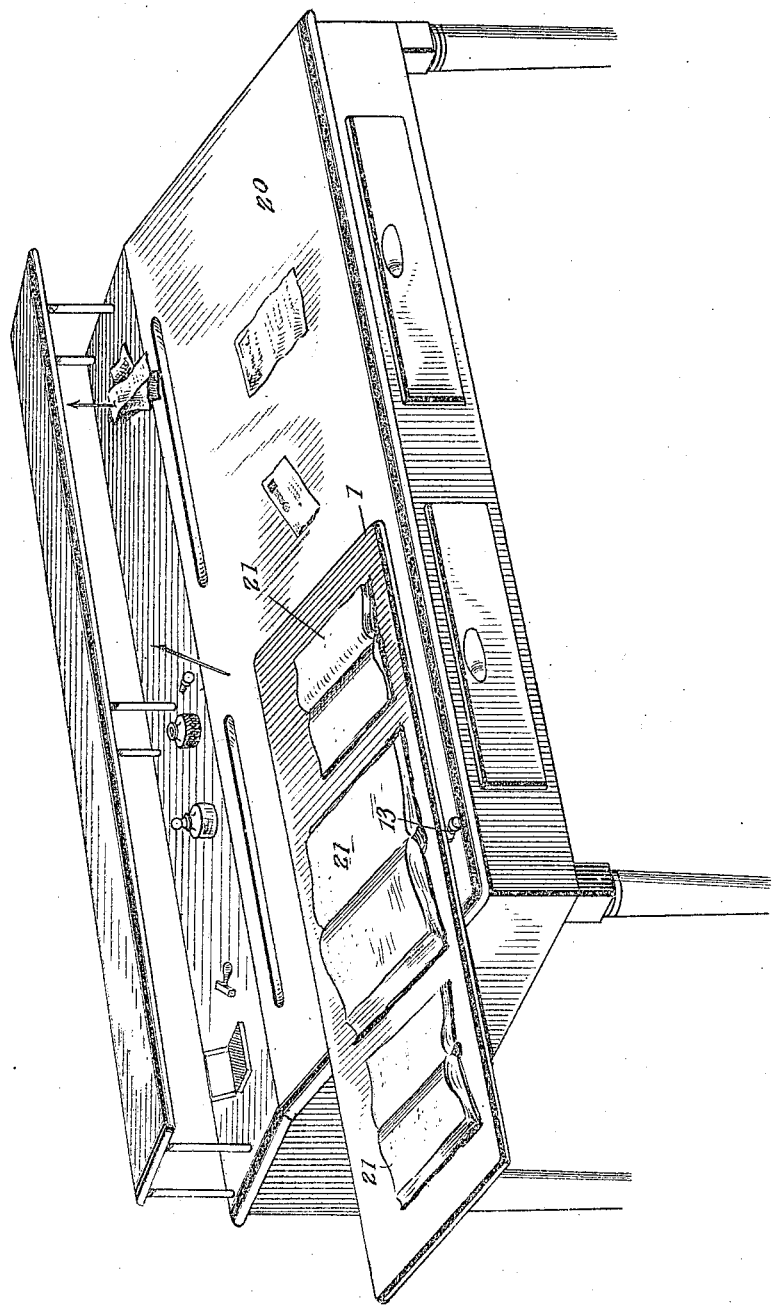

J. A. SMYLIE & G. D. McELWEE.
DESK ATTACHMENT.
APPLICATION FILED OCT. 11, 1909.

949,666.

Patented Feb. 15, 1910.
2 SHEETS—SHEET 1.

WITNESSES
L. H. Schmidt
C. E. Trainor

INVENTORS
JAMES A. SMYLIE,
GEORGE D. McELWEE,
BY Munn & Co.
ATTORNEYS

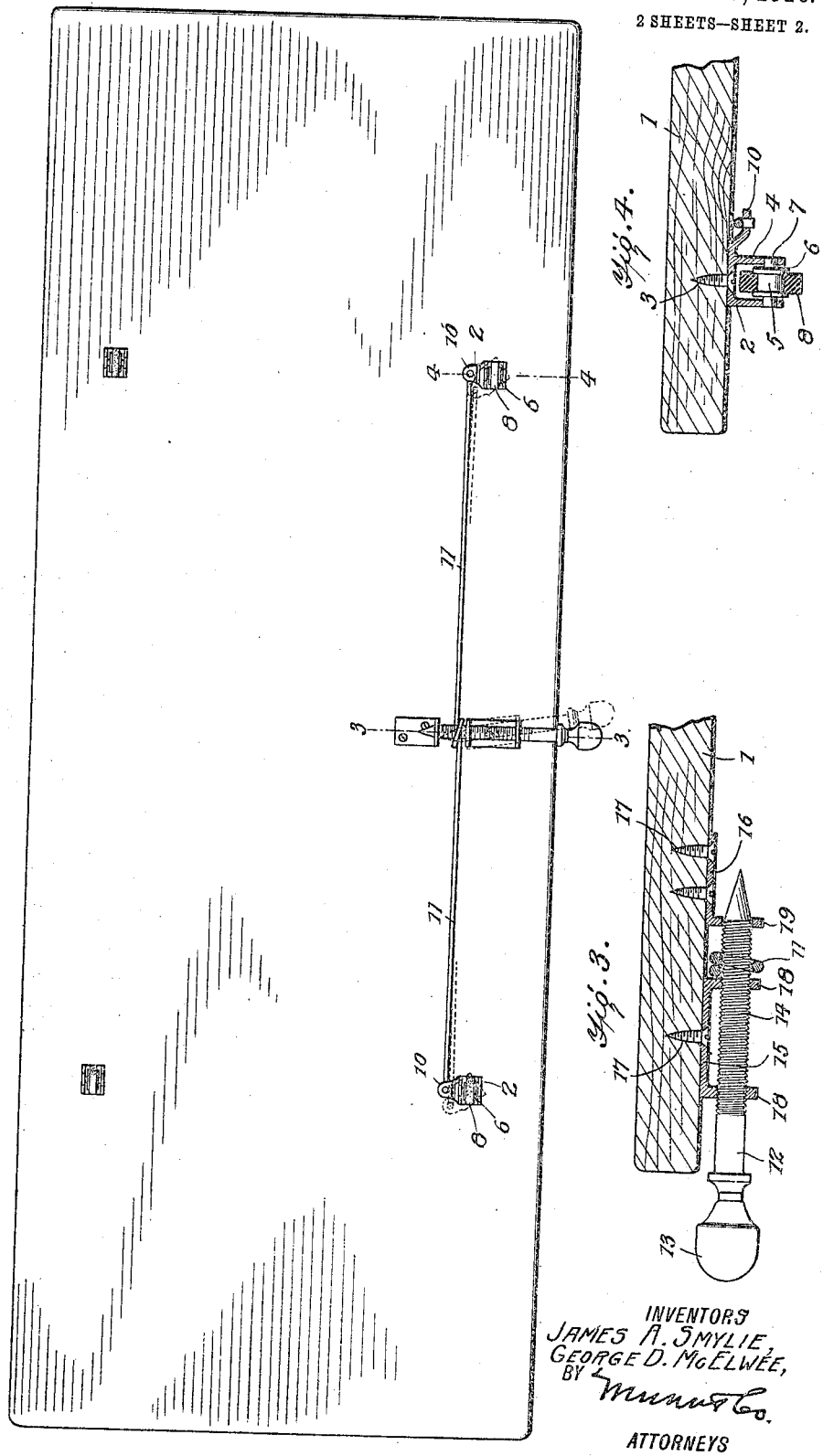

UNITED STATES PATENT OFFICE.

JAMES A. SMYLIE AND GEORGE D. McELWEE, OF CENTERVILLE, MISSISSIPPI.

DESK ATTACHMENT.

949,666.

Specification of Letters Patent. Patented Feb. 15, 1910.

Application filed October 11, 1909. Serial No. 521,989.

*To all whom it may concern:*

Be it known that we, JAMES A. SMYLIE and GEORGE D. McELWEE, citizens of the United States, and residents of Centerville, in the county of Wilkinson and State of Mississippi, have invented certain new and useful Improvements in Desk Attachments, of which the following is a specification.

Our invention is an improvement in desk attachments, and consists in certain novel constructions, and combinations of parts hereinafter described and claimed.

The object of the invention is to provide a device of the character specified, to facilitate the handling of books in office work, and consisting of a carriage, wherein novel features of adjusting and controlling the travel of the same are made use of, permitting the carriage to travel in any inclined plane without the use of a track or guard.

Referring to the drawings forming a part hereof, Figure 1 is a perspective view of a desk provided with the improvement, Fig. 2 is a bottom plan view of the improvement and Figs. 3 and 4 are sections on the lines 3—3 and 4—4 respectively of Fig. 2.

The present embodiment of the invention comprises a carriage, consisting of a plate 1 preferably of wood, which is provided on its under surface with a plurality of brackets, each consisting of a body portion 2, provided with an opening for receiving a screw 3, by means of which it may be secured to the plate, and a pair of arms 4, between which is journaled a wheel to be described.

Each wheel (Fig. 4) consists preferably of a metal roller 5 having end flanges 6, and trunnions 7 which are received in bearings in the arms, and a tire 8 of rubber or other suitable material encircles the roller between the flanges. The wheels engage and run over the desk top, and the rubber tire is designed to prevent injury to the said top.

The wheels are arranged near the side edges of the plate and are four in number, two near each side edge, and the brackets of the two near the front edge of the plate are each provided with a lateral lug 10, extending toward the corresponding bracket on the opposite side of the plate.

The lugs 10 are perforated, and are connected by a flexible rod or link 11, the ends of the link being pivoted to the respective ears. Approximately midway between the two brackets above mentioned is arranged the shifting mechanism, which is connected with the link.

The said mechanism comprises a shaft 12, provided with a knob or handle 13, and with a threaded portion 14. A pair of brackets 15 and 16 are secured to the plate by means of screws 17, the bracket 15 having two spaced arms 18, and the bracket 16 one arm 19, and each of the arms 18 is provided with a threaded opening for receiving the shaft.

The brackets are spaced apart from each other transversely of the plate, and the link 11 is wound a complete turn around the shaft between the arms 18 and 19 of the brackets. The brackets at the rear edge of the plate are fixed firmly to the plate 3, but those at the front edge are rotatable on the screws, so that when the link 11 is moved longitudinally, the brackets are oscillated on a vertical axis.

In operation, the carriage is arranged on the desk 20 as shown in Fig. 1 and the books 21 are placed thereon. When it is desired to move the carriage the knob 13 is grasped and the carriage is moved in the desired direction. By swinging the knob as indicated in dotted lines in Fig. 1 the wheels at the front of the table may be turned to guide the carriage. The axis of rotation of the wheels is transverse to the longest dimension of the carriage, and the carriage is placed on the desk, with the said longest dimension substantially parallel with the longest dimension of the desk, or with the front edge of the desk. When the knob 13 is oscillated in either direction, the axis of rotation of the wheels at the front of the carriage are simultaneously inclined with respect to the axes of rotation of the wheels at the rear edge of the carriage. When the carriage is moved with the axes so arranged the tendency is for the carriage to move rearwardly at all times.

It will be evident that the carriage may be guided in any direction by the proper manipulation of the front wheels. Since the axes of rotation of the rear wheels is transverse to the desk, there can be no straight forward movement of the carriage, and there is no liability of it slipping off the desk.

The improved attachment may be used on the finest desks, without the slightest risk of marring the same, by reason of the rubber tires, and may be used on a very short desk, since the wheel base of the carriage is very short.

The device may also be used on any kind of desk either flat or sloping top and without any track or guard.

When not in use the carriage may be pushed to one side, and entirely out of the way.

We claim:

1. A device of the class described comprising a plate having near each side edge a pair of brackets, each consisting of a body portion, having an opening, and a pair of spaced arms, a screw traversing the opening and engaging the plate, a roller having trunnions journaled in the arms, and having an annular flange at each end, a rubber tire on the roller, the rear brackets being fixed, and the front brackets rotatable on the screws, each of said front brackets having a lateral lug, a flexible link connecting the lugs, a pair of brackets spaced apart transversely of the plate midway between the front bracket and each provided with arms having threaded openings, a stem having a knob extending beyond the plate, and a threaded portion engaging the threaded openings, the link being wrapped around the threaded portion intermediate the arms.

2. A device of the class described, comprising a plate provided near each corner with a bracket, the brackets near one side edge being rotatable and each having a lateral extension, a wheel journaled in each bracket, a shaft journaled intermediate the rotatable brackets and having a knob for manipulating the same, and a threaded portion, and a flexible connection between the extensions of the bracket and winding on the threaded portion of the shaft.

3. A device of the class described comprising a plate provided near each corner with a bracket, the brackets near one side edge being rotatable and each having a lateral extension, a wheel journaled in each bracket, a shaft journaled intermediate the rotatable brackets and having a knob for manipulating the same, and a flexible connection between the extensions and winding on the shaft.

4. A device of the class described comprising a plate, a wheel at each corner of the plate, the axes of said wheels being normally parallel, a shaft at one side of the plate and parallel with the axes of the wheels, and a connection between the shaft and the wheels at that edge, for oscillating said wheels on their connection with the plate to simultaneously incline their axes of rotation in the same direction for the purpose specified.

JAMES A. SMYLIE.
GEO. D. McELWEE.

Witnesses:
E. J. Parsons,
J. A. Anderson.